June 30, 1970 P. J. SELGIN 3,518,441
OPTICAL GAGE FOR MEASURING THE THICKNESS OF
A CONTINUOUS WEB
Filed Jan. 24, 1968 3 Sheets-Sheet 1

INVENTOR.
Paul J. Selgin
BY
Leonard S. Selman
ATTORNEY

June 30, 1970  P. J. SELGIN  3,518,441
OPTICAL GAGE FOR MEASURING THE THICKNESS OF
A CONTINUOUS WEB Filed Jan. 24, 1968  3 Sheets-Sheet 2

INVENTOR.
Paul J. Selgin

BY

Leonard S. Selman
ATTORNEY

United States Patent Office 3,518,441
Patented June 30, 1970

3,518,441
OPTICAL GAGE FOR MEASURING THE THICKNESS OF A CONTINUOUS WEB
Paul J. Selgin, Bethel, Conn., assignor to Neotec Corporation, Rockville, Md., a corporation of Delaware
Filed Jan. 24, 1968, Ser. No. 700,088
Int. Cl. G01n 21/30
U.S. Cl. 250—219          8 Claims

ABSTRACT OF THE DISCLOSURE

This disclosure relates generally to an optical gage which utilizes light rays directed across the surface of a longitudinally transported web of sheet material for measuring the thickness of the web by determining changes in position of the surface of the web from a predetermined reference point or plane.

BACKGROUND AND SUMMARY OF INVENTION

In the past, optical gages of various types have been devised which, although operative for their own purposes, were nevertheless characterized by certain disadvantages. For example, many of the gages utilize a plurality of photocells with comparative changes in light striking each cell indicating variations in the web such as a change in web thickness. The apparatus herein disclosed, however, utilizes only a single photocell which has the advantage that differences in photocell characteristics can no longer cause error or drift. Formerly, such differences were troublesome due to differences in temperature between the photocells or other environmental conditions the cells may be exposed to. Other advantages of the present invention include a web area that is completely free of instrumentation. Thus, unlike some prior devices, nothing is in the way of operators threading the web through the machine and there is no chance of the instrument touching the web.

As described in detail later in the description, the gage of this invention has a separate housing for its light source and its photocell assembly. The light source may be placed directly on the framework, which supports a calender roller or other web-supporting element, and located on one side of the web and spaced from the point of measurement. A beam of light issues from the light source housing and passes diagonally across the web at some point of its width. The web passing over the supporting roller is curved at the point of measurement. The light beam traverses the width of the web and may extend considerably further to a remotely placed receiver. In most cases, however, the receiver which is quite compact, as is the light source, will be mounted on the framework diagonally opposite the light source housing. By an arrangement unique with respect to any other web measuring device, the present invention utilizes the height of the shadow of the moving web as it crosses the point of measurement to measure the web width. This arrangement gives rise to another important advantage of the device whereby magnification of thickness changes in the web is possible by changing the distance ratio between the two segments of the light beam (from light source to web and from web to receiver). Thus, a shadow cast by the web may move one hundredth of an inch while the web thickness increases by one thousandth. To take advantage of this magnification and increase in accuracy all that is required is to have a fixed space relationship between the roller supporting the web and the element which serves as the source of the light beam as described in the following detailed description.

Several further advantages of the invention disclosed herein include the accessibility of the light source housing and receiver for maintenance and cleaning and the ease in which several light sources and receivers can be used together to measure thickness at several points across the web width.

Accordingly, it is an object of this invention to provide a novel web thickness measuring device which is extremely accurate while leaving the web free from obstruction.

It is another object of this invention to provide a novel web thickness measuring device which utilizes a single photocell and thus is not subject to variations in photocell characteristics in the manner that devices which utilize a plurality of photocells are.

Still another object of the invention is to provide a novel light source and receiver web measuring system wherein the receiver is responsive to the shadow cast by the web moving between said light source and receiver.

A further object of the invention is to provide a novel web measuring device wherein the web travels between a light source and a receiver and a photocell included in an electrical circuit is responsive to the height or coverage of the shadow cast by the web on the receiver whereby the current in the electrical circuit may be affected in accordance with the height of said shadow and certain variations in said current may indicate web thickness.

The foregoing and other objects of the invention will become clear from a reading of the following specification in conjunction with an examination of the appended drawings.

DESCRIPTION OF THE PREFERRED EMBODIMENT

Figure 1:
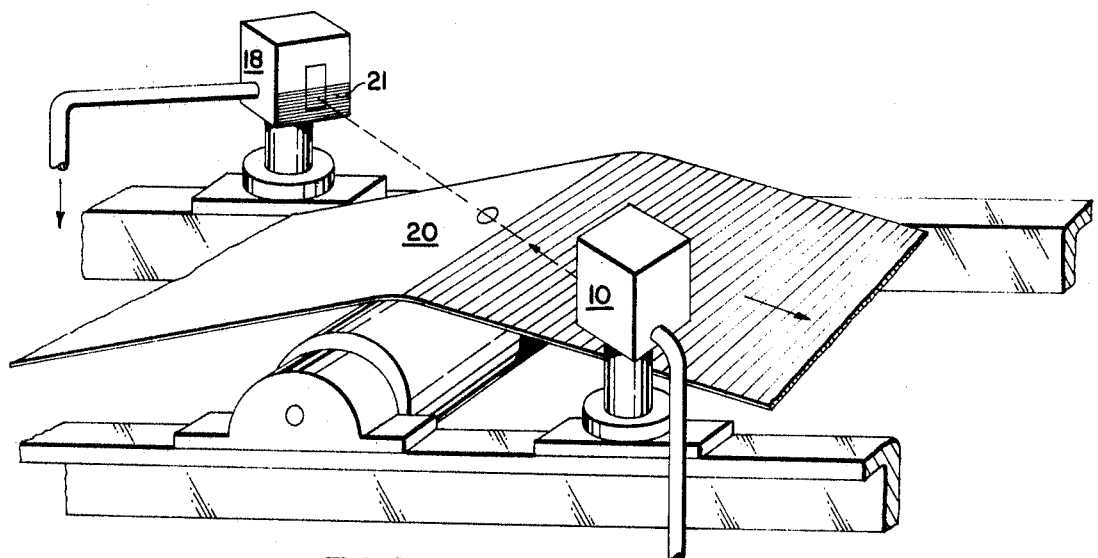
FIG. 1 is a perspective view showing the moving web, the light source and the receiver of the inventive gage.
Figure 2:
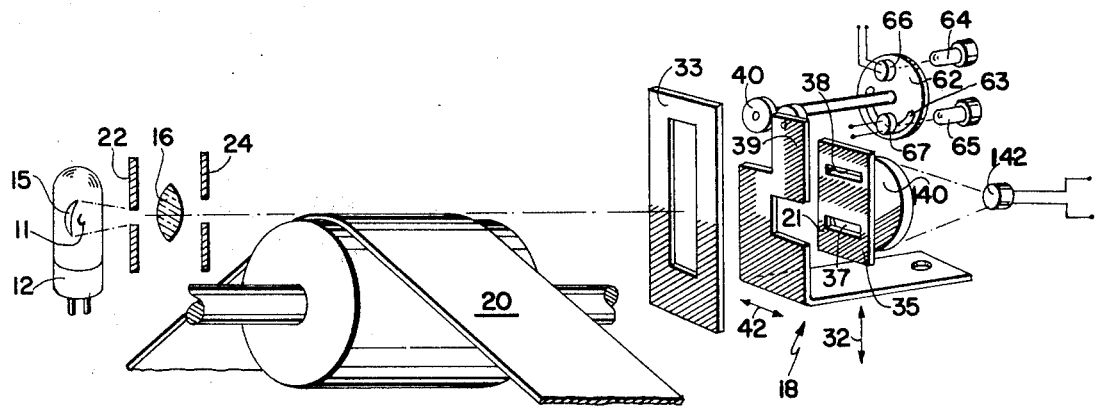
FIG. 2 is a schematic view showing some of the internal elements of the light source and receiver.

The light source as shown in its housing 10 in FIG. 1 comprises the filament 11 of bulb 12 and a spherical mirror 15 as shown in FIG. 2. A lens 16 focusses and magnifies the real image of filament 11 formed by mirror 15 on the front face or screen of receiver 18 which is shown in FIG. 1 positioned across the traveling web 20. A shadow 21 is cast by the web 20 on the front face of receiver 18, as shown. The entire front surface of the receiver is thus covered with substantially uniform illumination. This arrangement is such that small changes in the position of filament 11 would not effect illumination of the central front portion of the receiver and impair the operation of the device. Of course, a large change resulting in loss of illumination would make the device inoperative, however, this condition is easily detected and corrective measures can be taken. In practice, the bulb 12 is mounted such that large movements are all but impossible.

It is important to the operation of the device that the shadow cast by the web must be sharp and clearly defined. Interception by the web alone of the filament image as projected by the lens 12 only tends to partially or totally obscure the image but no sharp shadow is formed. However, elements 22 and 24 positioned as shown in FIG.

2 on either side of the lens having slits parallel with the web surface result in a sharp shadow. The position of the shadow is dependent primarily on the position of the slits in elements 22 and 24 and the web position, the lens 12 having only a minor effect. Rigid mounting of the slit bearing elements and the lens is required and easily achieved so that the shadow will accurately reflect changes in web thickness.

RECEIVER

Figure 3:
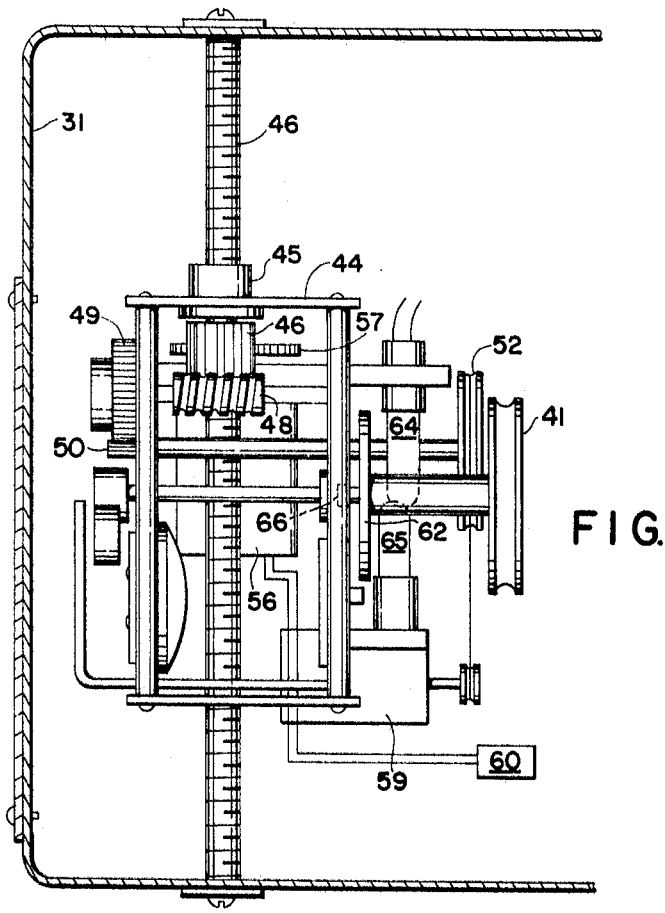
FIG. 3 is a partially sectional view of the receiver showing the driving means for the movable receiver elements.

The receiver 18, shows in FIGS. 2 and 3, is encased in a housing 31 and is mounted to reciprocate vertically within the housing as indicated by the arrows 32 at right angles with the shadow formed by the web. The receiver has a window 33 through which light from bulb 12 may enter and strike screen 35 which has a pair of openings 37 and 38 of unequal width. In front of screen 35 is an oscillating member 39 which is driven by eccentric cam 40 mounted on the shaft of pulley 41 driven by a motor, not shown. The member 39 oscillates as shown by arrows 42 and has cut-out portions 43 and 44 so that as it oscillates it uncovers opening 37 as it covers opening 38 in equal amounts resulting in an oscillation in the amount of light passing through the two openings since their widths are unequal. If the shadow occupies a part of the wider opening 37 it will compensate for the difference in width, however, and the amount of light transmitted through the openings will remain uniform at some point of the shadows progress across the lower opening 37. If the shadow rises above this level, there will again be oscillation of transmitted light but with opposite phase. A lens 140 concentrates the light transmitted through windows 37 and 38 so that it falls on photocell 142 or other photosensitive means which functions in the circuit of FIG. 5 to cause a phase inversion of an alternating voltage in said circuit when the shadow is exactly at the right height. Provision has been made to automatically drive the receiver carriage 44 into equilibrium position when the shadow of the web is too high or too low in relation to opening 37. The mechanical driving means include an internally threaded collar 45 on carriage 44 engaging screw 46 vertically positioned in housing 31 as shown in FIG. 3. The collar 45 is fixed to internally threaded gear 46 which is driven by means of worm 48, gear 49, pinion 50 and pulley 52. The pulley 52 is driven by motor 54 shown in FIG. 3 and in the circuit of FIG. 5. To register the deviation from the equilibrium, a potentiometer 56 is provided which is driven by means of gear 57, which engages gear 46 as shown in FIG. 2. The potentiometer 56 may be a 10 turn heliopot type and as it is turned according to the travel of the receiver carriage 44 on screw 46 its setting may be reproduced remotely by a bridge type recorder, or a meter 60 can be used to show deviations from a center value.

As shown in FIGS. 2 and 3, aforementioned pulley 41 driven by a motor, not shown, drives a disc 62 having a curved slot 63 therein which allows light from the pair of light sources 64 and 65 to alternately strike the synchronous photocells 66 and 67. The exact function of these elements will be explained in the description of the circuit of FIG. 5.

Figure 4:
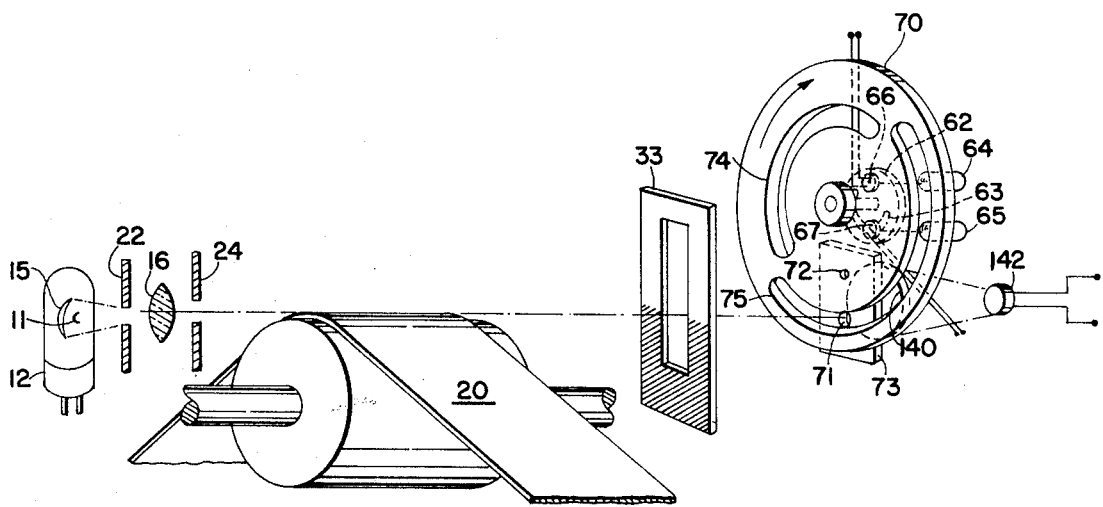
FIG. 4 is a fragmentary view of the receiver and light source showing certain elements thereof.

FIG. 4 shows another embodiment of the invention in which instead of oscillating member 39, as shown in FIG. 2, a rotatable wheel 70 is provided which covers and uncovers two holes 71 and 72 in screen 73. In a similar manner to openings 37 and 38, one of the holes 71 is larger than the other hole 72 and as the wheel 70 rotates the slits 74 and 75 result in an oscillation in the amount of light passing through the two holes. If the shadow 21 from the web occupies a part of the larger hole 71, it will compensate for the difference in size however, and the amount of light transmitted through the holes will remain uniform at some point of the shadows progress across the hole 71. If the shadow rises above this level, there will again be oscillation of transmitted light but with opposite phase. The lens 40 concentrates the light transmitted through holes 71 and 72 so that it falls on photocell 42 just as shown in FIG. 2.

CONTROL CIRCUIT

Figure 5:
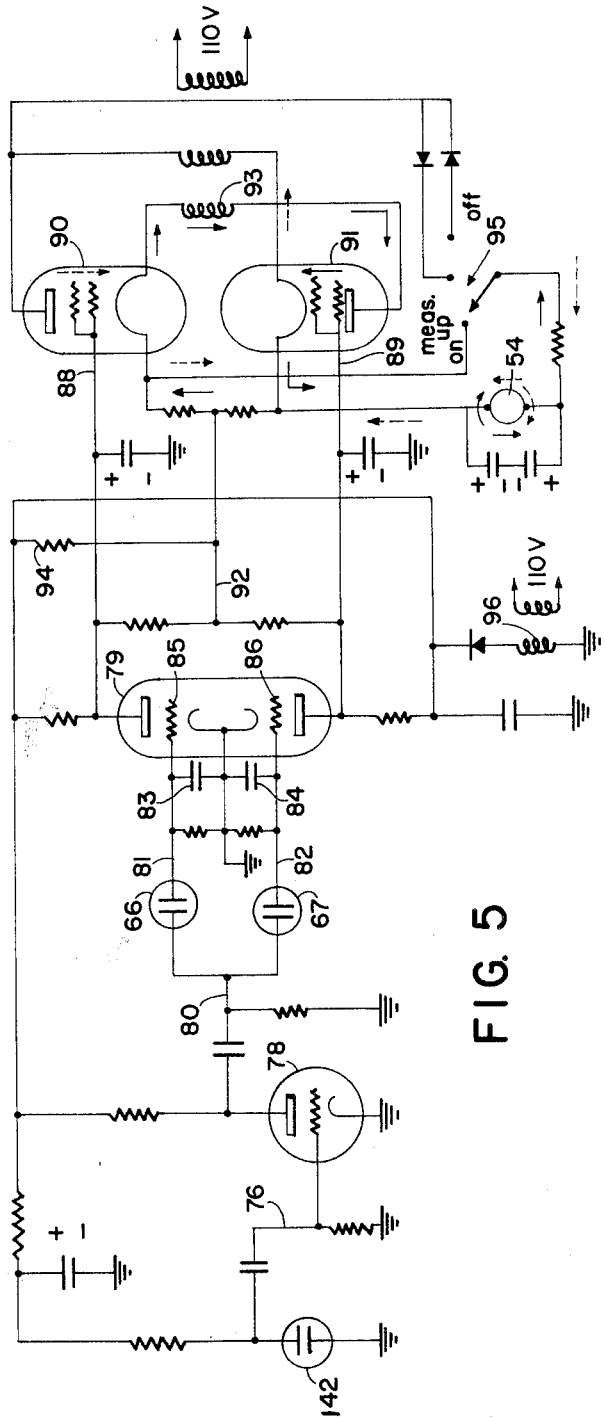
FIG. 5 is a schematic diagram showing the photocell system and cooperating electrical means which control the operation of the gage.
Figure 5A:
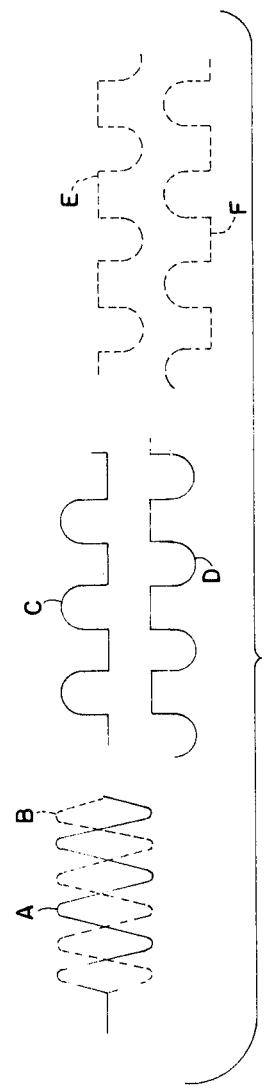
FIG. 5a is a graphic representation of certain electrical parameters at various points in the electrical circuit of FIG. 5.

The control circuit for the device, as shown in FIG. 5, includes the photocell 42 which, as explained above, receives light through openings 37 and 38 (or holes 71 and 72) and when the shadow is below opening 37 the larger opening allows more light through when uncovered and the voltage output from photocell 142, at point 76, will be as in A solid line in FIG. 5a. If, however, the shadow is above the opening 37, the smaller opening 38 receives the greater part of the light when uncovered which is during the other half of the cycle. In this case, voltage at point 76 will appear approximately as shown in B dotted line of FIG. 5a.

Triode 78, or the equivalent, with its associated standard elements as known in the art, simply amplifies voltages at point 76. The amplified output is applied to both grids of double triode 79 or its equivalent through photocells 66 and 67. Only one of these conduits at any given time since one or the other receives strong direct illumination from lamps 64 and 65 through the opening 63 of disc 62, FIG. 5, which is designed to expose each photocell during half of revolution of 62. The photocells 66 and 67 are such that their conductance varies inversely with the amount of light falling upon them. The oscillating member 39 and the disc 62 are mounted so that the uncovering of opening 38 and the photocells 66 occur simultaneously. The same is true of opening 37 and photocell 67. Assuming that the shadow is below opening 37 and that the voltages A and B, FIG. 5a, now represent the amplified voltage at point 80 rather than at point 77 as initially indicated; the voltage at point 77 will appear as A but the current at point 81 will appear as C, FIG. 5a, the negative half waves being stopped by photocell 66 which is non-conductive at the time. Similarly, the current at point 82 is shown as D, FIG. 5a. Due to the smoothing effect of capacitors 83 and 84, the resulting voltage at grid 85 is continuously positive and at grid 86 is continuously negative. When the shadow is above hole 37, the voltage at point 80 will now appear as B dotted line, and consequently the current at point 81 will appear as E, as shown in FIG. 5a, and the current at point 82 will appear as F, FIG. 5a. Consequently, when the shadow is above 37, the voltage is continuously negative at grid 85 and positive at grid 86.

Double triode 79 amplifies the continuous or D.C. voltage generated at grids 85 and 86 and these are reflected as D.C. voltages, appearing after amplification, at grids 88 and 89 of thyratrons 90 and 91, these voltages having point 92 as a reference (instead of ground as formerly). For example, when the shadow is below opening 37, the voltage with respect to point 92 will be negative at 88 and positive at 89 (due to customary inversion caused by triode amplification). Consequently, thyratron 91 will conduct and 90 will not. The current through thyratron 91, transformer winding 93, and D.C. motor 54 is shown by the solid arrows and rotation of motor 54 will be (for example) clockwise, causing carriage 44, FIG. 3, to be driven downwardly until the shadow 21 covers a part of opening 37, at which time illumination of photocell 142 will be evenly balanced during the two halves of the cycle and D.C. voltages at grids 88 and 89 will be equal or slightly below that at point 92 (due to biasing resistor 94). Motor 54 will now receive no current and the system will be in equilibrium. Conversely, when the shadow is above opening 37, thyratron 90 will conduct and 90 will not. The current through the motor circuit will be in the direction of the dotted arrow and carriage 44, FIG. 3, will be driven upwardly until opening 37 is partly illuminated as before bringing equilibrium.

In conclusion, the circuit is such that the carriage 44, FIG. 3, will always be returned to a position wherein a predetermined portion of opening 37 is covered by the shadow, and the position of carriage 44 and consequent setting of potentiometer 56 as read on meter 60 provides a measure of the height of shadow 21, which accurately reflects the thickness of material 20 which is being measured.

Other elements shown in the electrical circuit of FIG. 5 include manual switch 95, transformer winding 96 and other standard resistors, capacitors, and other circuit elements as known in the art.

I claim:

1. A gage for measuring the thickness of a traveling web comprising:
  a light source for directing light across the web to be measured;
  a receiver including a screen illuminated by said light source, said screen being positioned relative to said light source and said web for receiving the shadow of said web thereon; said screen having formed therein a pair of different size openings for passing light from said source therethrough, the amount of light passing through one opening as compared to the other being dependent upon the extent of travel of the shadow across said screen, said receiver including an electrical circuit including a source of potential and photosensitive means responsive to the portion of the light from said source passing through the openings in said screen for affecting the flow of electrical current in said circuit in a manner indicative of web thickness.

2. The gage of claim 1 including means for producing a sharply defined edge on said shadow falling on the receiver screen.

3. The gage of claim 2 wherein the means for producing said sharply defined edge on said shadow include at least one element having a narrow slit for passing light from said source toward said web.

4. The gage of claim 1 wherein said receiver includes means for cyclically covering and uncovering each of said openings in said screen, the relative amounts of light passing through each of said openings as regulated by the extent of travel of said shadow causing said photosensitive means to affect the flow of electrical current in said circuit in a manner indicative of web thickness.

5. The gage of claim 4 wherein drive means are connected in said electrical circuit responsive to said flow of electrical current, said means being operative to move said screen back and forth in response to the extent of travel of the shadow across the said screen covering more or less of at least one of said openings; and
  means responsive to the back and forth movement of said screen and connected to means for indicating the varying thickness of said web as it travels in its path.

6. The gage of claim 5 wherein said openings of unequal size are positioned to allow more light to pass through one opening than the other except when said shadow is effective to allow only equal amounts of light to pass through the respective openings.

7. A gage for measuring web thickness comprising:
  a light source for directing light across the web to be measured, said light source including a bulb, a lens and an element having a slit therein placed between the bulb and the lens for causing the web to cast a sharp shadow;
  a receiver including a screen illuminated by said light source, the shadow of said web falling on said screen, a pair of openings in said screen each of a different size and positioned in said screen such that the shadow of the web covers at least a part of one of said openings and means for cyclically covering and uncovering each of said openings in said screen;
  electrical circuit means including a source of potential and a photocell responsive to the illumination which passes through said openings in said screen, the relative light passing through each of said openings as regulated by the coverage of said shadow causing said photocell to vary its electrical resistance in the circuit whereby the resultant flow of electrical current is responsive to the coverage of said shadow which is dependent upon the thickness of said web;
  a motor connected in said electrical circuit responsive to said resultant flow of electrical current and operative to move said screen back and forth in response to the extent of travel of the shadow across the face of said screen covering more or less of at least one of said openings; and
  a potentiometer responsive to the back and forth movement of said screen and connected to a meter calibrated to record the varying thickness of said web as it travels in its path.

8. The gage of claim 7 wherein said openings of unequal size are positioned to allow more light to pass through one opening than the other except when the coverage of the shadow is effective to allow only equal amounts of light to pass through the respective openings, bringing said flow of electrical current to an equilibrium state where it remains constant.

References Cited

UNITED STATES PATENTS

| 1,963,128 | 6/1934 | Geister. |
| 2,719,235 | 9/1955 | Emerson. |
| 3,183,764 | 5/1965 | Sundstrom _____ 250—204 X |
| 3,206,606 | 9/1965 | Burgo et al. |
| 3,292,484 | 12/1966 | Clay _____ 250—233 X |
| 3,330,961 | 7/1967 | Juengst et al. |

ARCHIE R. BORCHELT, Primary Examiner

C. M. LEEDOM, Assistant Examiner

U.S. Cl. X.R.

250—204, 219, 233; 72—16